July 1, 1924.
M. A. DAVIS
PISTON RING
Filed Nov. 11, 1920
1,499,571
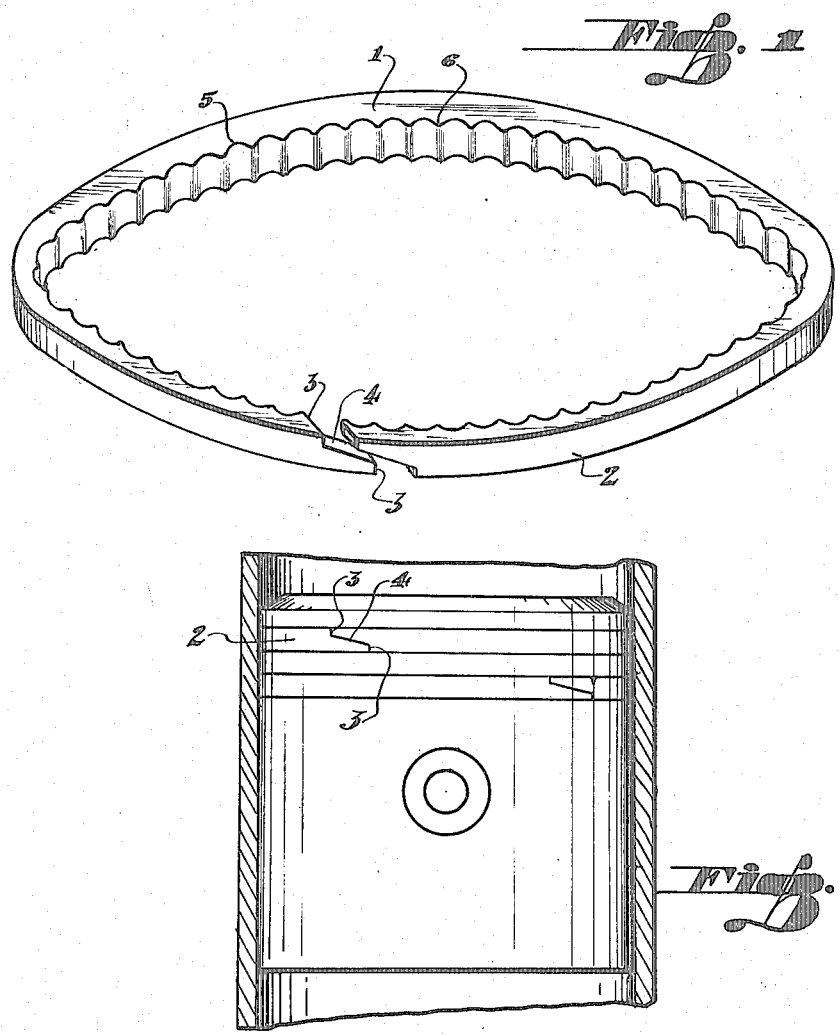
INVENTOR
M. A. Davis
by Hazard & Miller
ATTYS Patented July 1, 1924.

1,499,571

UNITED STATES PATENT OFFICE.

MORRIS A. DAVIS, OF LOS ANGELES, CALIFORNIA.

PISTON RING.

Application filed November 11, 1920. Serial No. 423,337.

*To all whom it may concern:*

Be it known that I, MORRIS A. DAVIS, a citizen of the United States, residing at Los Angeles, in the county of Los Angeles and State of California, have invented new and useful Improvments in Piston Rings, of which the following is a specification.

It is the object of this invention to provide a piston ring having the split therein so arranged as to provide a leak proof joint and also so constructed that the pressure of the expanding gases will tend to cause rotation of the piston ring in its groove.

It is a further object of the invention to provide a piston ring having ribs upon its entire periphery extending across the ring and so arranged that during said rotation of the ring in its groove the contact of said ribs against the base of the groove will tend to cut away any carbon deposits and thereby prevent the accumulation of the carbon in rear of the piston ring.

It is a still further object of the invention to so construct these ribs as to form means for retaining the piston ring in its normal shape, the ring being so constructed as to have its ends normally spaced apart at its split and conforming to a true circle when in normal position. The ribs upon the entire periphery of the ring tending to hold the latter in its position conforming to a true circle, will tend to expand the ring when the latter is compressed in its groove and will thus cause intimate engagement throughout the entire exterior periphery of the ring with the wall of the cylinder in which the piston is received.

The invention will be readily understood from the following description of the accompanying drawings, in which:

Figure 1 is a perspective view of a piston ring constructed in accordance with the invention, and showing it in its normal position before compressed in the groove of a piston.

Fig. 2 is a longitudinal section through a cylinder having a piston therein provided with the improved piston rings.

The piston ring is provided with the usual faces 1 and 2, and the split in said ring consists of splits 3 extending inwardly from the respective faces of the ring and circumferentially offset as clearly shown in Fig. 1. These splits are connected by a split 4 which extends diagonally across the ring between faces 1 and 2. The splits 3 and 4 also extend diagonally across the ring between the inner and outer peripheries of the latter. The ring as thus constructed, is so arranged that when in normal position the split ends of the ring are spaced apart, as clearly shown in Fig. 1, and when in its normal position the ring conforms substantially to a true circle.

The inner periphery of the ring is provided with flutings 5 forming ribs 6 circumferentially spaced around the entire inner periphery of the ring and extending across the latter between the respective faces 1 and 2. These flutings will tend to hold the ring in its normal position, as shown in Fig. 1, and the rib 6 will also form cutting edges adapted to remove any carbon from the groove in which the piston ring is received when the piston ring is rotated in said groove.

In placing the piston ring in its groove it is compressed, and when the piston is placed in its cylinder the ends of the piston rings will be forced toward one another through contact with the walls of the cylinder. As a result the inclined surfaces of the ring ends forming the split 4 will cause the ends to tend to move out of alinement longitudinally of the piston and will thus force the ends of the ring into closer contact with the side walls of the piston ring groove. At the same time the ends of the piston ring will tend to move out of alinement with relation to the circumference of the piston through the contact of the inclined surfaces forming the splits extending across the piston ring between the inner and outer peripheries. As a result the ends of the piston ring will more intimately engage the base of the piston ring groove and the wall of the piston cylinder in order to provide a leak proof construction.

The diagonal arrangement of the split in the piston ring will cause the expanding gases within the cylinder, which may find their way into the split of the ring, to tend to rotate the piston ring in its groove, and during said rotation of the piston ring the ribs 6 will cut away carbon deposits and thus prevent the accumulation of carbon between the piston ring and its groove.

Various changes may be made without departing from the spirit of the invention as claimed.

What is claimed is:

1. A piston ring having its inner periphery formed at intervals with relatively sharp projections.

2. A split piston ring conforming to a true circle when its split ends are spaced apart, said ring having uniform fluting extending across and around its inner periphery.

3. A piston ring having a split adapted to cause rotation of said ring in its groove under the action of the fluid pressure in a cylinder, and relatively sharp ribs extending across the inner periphery of said ring to engage the base of said groove during rotation of the ring.

4. A piston ring having a split inclined with relation to the surfaces of said ring and with relation to the axis of the ring to cause rotation of said ring in its groove, and relatively sharp ribs extending across the inner periphery of said ring to engage the base of said groove during rotation of the ring.

5. A piston ring having its periphery fluted to provide relatively sharp projections at regular intervals and intervening recesses of substantially semi-circular form.

6. A piston ring having its inner periphery fluted to provide relative sharp projections at regular intervals and intervening recesses of concave form.

7. A piston ring having means at its ends adapted to cause rotation of the ring in the groove of a piston under the action of the fluid pressure in a cylinder, and means on the inner periphery of the ring for engaging and removing carbon deposits in said groove during rotation of the ring.

In testimony whereof I have signed my name to this specification.

MORRIS A. DAVIS.